US008774516B2

(12) United States Patent
Amtrup et al.

(10) Patent No.: US 8,774,516 B2
(45) Date of Patent: *Jul. 8, 2014

(54) SYSTEMS, METHODS AND COMPUTER PROGRAM PRODUCTS FOR DETERMINING DOCUMENT VALIDITY

(71) Applicant: Kofax, Inc., Irvine, CA (US)

(72) Inventors: Jan Amtrup, Chevy Chase, MD (US); Anthony Macciola, Chino Hills, CA (US); Steve Thompson, Oceanside, CA (US)

(73) Assignee: Kofax, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,402

(22) Filed: Nov. 12, 2013

(65) Prior Publication Data

US 2014/0079294 A1    Mar. 20, 2014

Related U.S. Application Data

(63) Continuation-in-part of application No. 13/948,046, filed on Jul. 22, 2013, which is a continuation of application No. 13/691,610, filed on Nov. 30, 2012, now Pat. No. 8,526,739, which is a continuation of application No. 12/368,685, filed on Feb. 10, 2009, now Pat. No. 8,345,981.

(51) Int. Cl.
*G06K 9/00* (2006.01)

(52) U.S. Cl.
USPC ........... 382/182; 382/209; 382/218; 382/305; 382/317; 382/321

(58) Field of Classification Search
USPC .......... 382/181, 182, 209, 218, 305, 317, 321
See application file for complete search history.

(56) References Cited

U.S. PATENT DOCUMENTS 6,098,065 A    8/2000    Skillen et al.
6,882,983 B2   4/2005    Furphy et al.
(Continued)

FOREIGN PATENT DOCUMENTS

EP    1956518    8/2008
JP    09116720   5/1997
(Continued)

OTHER PUBLICATIONS

Non-Final Office Action from U.S. Appl. No. 12/368,685 dated Mar. 29, 2012.
(Continued)

*Primary Examiner* — Wesley Tucker
(74) *Attorney, Agent, or Firm* — Zilka-Kotab, PC

(57) ABSTRACT

In one embodiment, a method includes receiving an image of a document; performing optical character recognition (OCR) on the image; extracting an address of a sender of the document from the image based on the OCR; comparing the extracted address with content in a first database; identifying complementary textual information in a second database based on the address; and at least one of: extracting additional content from the image of the document; correcting one or more OCR errors in the document using the complementary textual information, and normalizing data from the document prior to determining a validity of the document using at least one of the complementary textual information and predefined business rules. At least one of the aforementioned operations is performed using a processor of a mobile device. Exemplary systems and computer program products are also disclosed.

30 Claims, 5 Drawing Sheets

(56) References Cited

U.S. PATENT DOCUMENTS

| | | | |
|---|---|---|---|
| 7,168,614 | B2 | 1/2007 | Kotovich et al. |
| 7,201,323 | B2 | 4/2007 | Kotovich et al. |
| 7,249,717 | B2 | 7/2007 | Kotovich et al. |
| 7,416,131 | B2 | 8/2008 | Fortune et al. |
| 7,430,310 | B2 | 9/2008 | Kotovich et al. |
| 7,657,091 | B2 | 2/2010 | Postnikov et al. |
| 7,778,457 | B2 | 8/2010 | Nepomniachtchi et al. |
| 7,787,695 | B2 | 8/2010 | Nepomniachtchi et al. |
| 7,949,167 | B2 | 5/2011 | Krishnan et al. |
| 7,953,268 | B2 | 5/2011 | Nepomniachtchi |
| 7,978,900 | B2 | 7/2011 | Nepomniachtchi et al. |
| 8,000,514 | B2 | 8/2011 | Nepomniachtchi et al. |
| 8,094,976 | B2 | 1/2012 | Berard et al. |
| 8,326,015 | B2 | 12/2012 | Nepomniachtchi |
| 8,345,981 | B2 | 1/2013 | Schmidtler et al. |
| 8,379,914 | B2 | 2/2013 | Nepomniachtchi et al. |
| 8,526,739 | B2 * | 9/2013 | Schmidtler et al. ........... 382/182 |
| 8,577,118 | B2 | 11/2013 | Nepomniachtchi et al. |
| 2004/0083119 | A1 | 4/2004 | Shunder |
| 2004/0181482 | A1 | 9/2004 | Yap |
| 2005/0131780 | A1 | 6/2005 | Princen |
| 2005/0246262 | A1 | 11/2005 | Aggarwal |
| 2006/0089907 | A1 | 4/2006 | Kohlmaier |
| 2006/0095373 | A1 | 5/2006 | Venkatasubramanian et al. |
| 2006/0095374 | A1 | 5/2006 | Lo et al. |
| 2006/0219773 | A1 | 10/2006 | Richardson |
| 2006/0263134 | A1 | 11/2006 | Beppu |
| 2007/0165801 | A1 | 7/2007 | Devolites et al. |
| 2007/0250416 | A1 | 10/2007 | Beach et al. |
| 2008/0097936 | A1 | 4/2008 | Schmidtler |
| 2008/0137971 | A1 | 6/2008 | King |
| 2008/0144881 | A1 | 6/2008 | Fortune |
| 2008/0147561 | A1 | 6/2008 | Euchner et al. |
| 2008/0177643 | A1 | 7/2008 | Matthews et al. |
| 2008/0215489 | A1 | 9/2008 | Lawson et al. |
| 2010/0202698 | A1 | 8/2010 | Schmidtler |
| 2013/0088757 | A1 | 4/2013 | Schmidtler |
| 2013/0308832 | A1 | 11/2013 | Schmidtler |

FOREIGN PATENT DOCUMENTS

| | | |
|---|---|---|
| JP | 2003196357 | 7/2003 |
| JP | 2005018678 | 1/2005 |
| JP | 2005173730 | 6/2005 |
| JP | 2006209588 | 8/2006 |
| JP | 2008134683 | 6/2008 |
| WO | WO9847098 | 10/1998 |
| WO | WO02063812 | 8/2002 |

OTHER PUBLICATIONS

Notice of Allowance and Fee(s) Due from U.S. Appl. No. 12/368,685 dated Aug. 30, 2012.
Non-Final Office Action from U.S. Appl. No. 13/691,610 dated Mar. 1, 2013.
Notice of Allowance and Fee(s) Due from U.S. Appl. No. 13/691,610 dated Jun. 24, 2013.
Non-Final Office Action from U.S. Appl. No. 13/948,046 dated Dec. 6, 2013.
Notice of Allowance from Japanese application No. 2011-549266 dated Dec. 18, 2013.
Japanese Office Action from application No. 2011-549266 dated Sep. 4, 2013.
European Search Report from application No. 10741580.4 dated Sep. 26, 2012.
International Preliminary Report and Written Opinion from PCT application No. PCT/US2010/023224 dated Aug. 25, 2011.
International Search Report and Written Opinion from PCT application No. PCT/US2010/23224 dated Apr. 5, 2010.
Brauer et al., "Robust recognition of complex entities in text exploiting enterprise data and NLP-techniques," 2008 IEEE, Third International Conference on Digital Information Management, Nov. 13, 2008, pp. 551-558.
Rainardi, V., "Building a Data Warehouse: With Examples in SQL Server, Chapter 15: Other Data Warehouse Usage," Apress, Dec. 27, 2007, pp. 471-474.
AutoMatch.
Non-Final Office from U.S. Appl. No. 14/176,006 dated Apr. 7, 2014.
Non-Final Office Action from U.S. Appl. No. 14/175,999 dated Apr. 3, 2014.

* cited by examiner

SYSTEMS, METHODS AND COMPUTER PROGRAM PRODUCTS FOR DETERMINING DOCUMENT VALIDITY

RELATED APPLICATIONS

This application is a continuation-in-part of U.S. patent application Ser. No. 13/948,046, filed Jul. 22, 2013, which is a continuation of U.S. patent application Ser. No. 13/691,610, filed Nov. 30, 2012, which is a continuation of U.S. Pat. No. 8,345,981 to Schmidtler et al., from each of which priority is claimed and each of which are herein incorporated by reference.

INCORPORATION BY REFERENCE

The following patent applications are herein incorporated by reference: Provisional U.S. Pat. App. Nos. 61/586,062, filed Jan. 12, 2012; 61/720,958, filed Oct. 31, 2012; 61/780,747, filed Mar. 13, 2013; 61/815,210, filed Apr. 23, 2013; 61/819,463, filed May 3, 2013; and 61/883,865, filed Sep. 27, 2013; and U.S. patent application Ser. No. 13/740,123, filed Jan. 11, 2013; Ser. No. 13/740,123, filed Jan. 11, 2013; Ser. No. 13/740,145, filed Jan. 11, 2013; and Ser. No. 13/802,226, filed Mar. 13, 2013.

FIELD OF THE INVENTION

The present invention relates to document analysis systems, methods, and computer program products, and more particularly, this invention relates to systems, methods, and computer program products for determining document validity.

BACKGROUND OF THE INVENTION

In the present day, business transactions are recorded as an exchange of information between two or more parties. The information is generated by the sender and can come to the receiver via a variety of means, e.g. via a paper document, an electronic document, etc. Within a business transaction it is implicitly assumed that both parties have some information about the document content and the type of transaction.

Many times, the receiving party has to validate the content of the received document by comparing the document's content with its view of the transaction. This, for example, can be achieved by a human reading the document and comparing the document content to corresponding content already in the recipient's possession. However, the layout and the forms of documents differ vastly between senders and are loosely structured, making the automatic extraction and recognition of the relevant information very challenging and inaccurate. Moreover, such manual review is both time consuming and expensive.

Therefore, there is a current need for an improved method of automatic business transaction document validation.

SUMMARY

In one embodiment, a method includes receiving an image of a document; performing optical character recognition (OCR) on the image; extracting an address of a sender of the document from the image based on the OCR; comparing the extracted address with content in a first database; identifying complementary textual information in a second database based on the address; and at least one of: extracting additional content from the image of the document; correcting one or more OCR errors in the document using the complementary textual information, and normalizing data from the document prior to determining a validity of the document using at least one of the complementary textual information and predefined business rules. At least one of performing the OCR, extracting the address, comparing the extracted address, identifying the complementary textual information, extracting the additional content, correcting the one or more OCR errors and normalizing the data is performed using a processor of a mobile device.

In another embodiment, a method includes receiving an image of a part or all of a document selected from a group consisting of: an invoice, a bill, a receipt, a sales order, an insurance claim, a medical insurance document, and a benefits document; performing optical character recognition (OCR) on the image; extracting at least a partial address of a sender of the document; comparing the at least partial address of the sender to a plurality of addresses in a first database; and identifying one or more of: textual information specific to the sender; and data formatting specific to the sender. At least one of performing the OCR, extracting the at least partial address, and identifying one or more of the textual information and the data formatting specific to the sender is performed using a processor of a mobile device.

Systems and computer program products for providing, performing, and/or enabling the methodology presented above are also presented.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
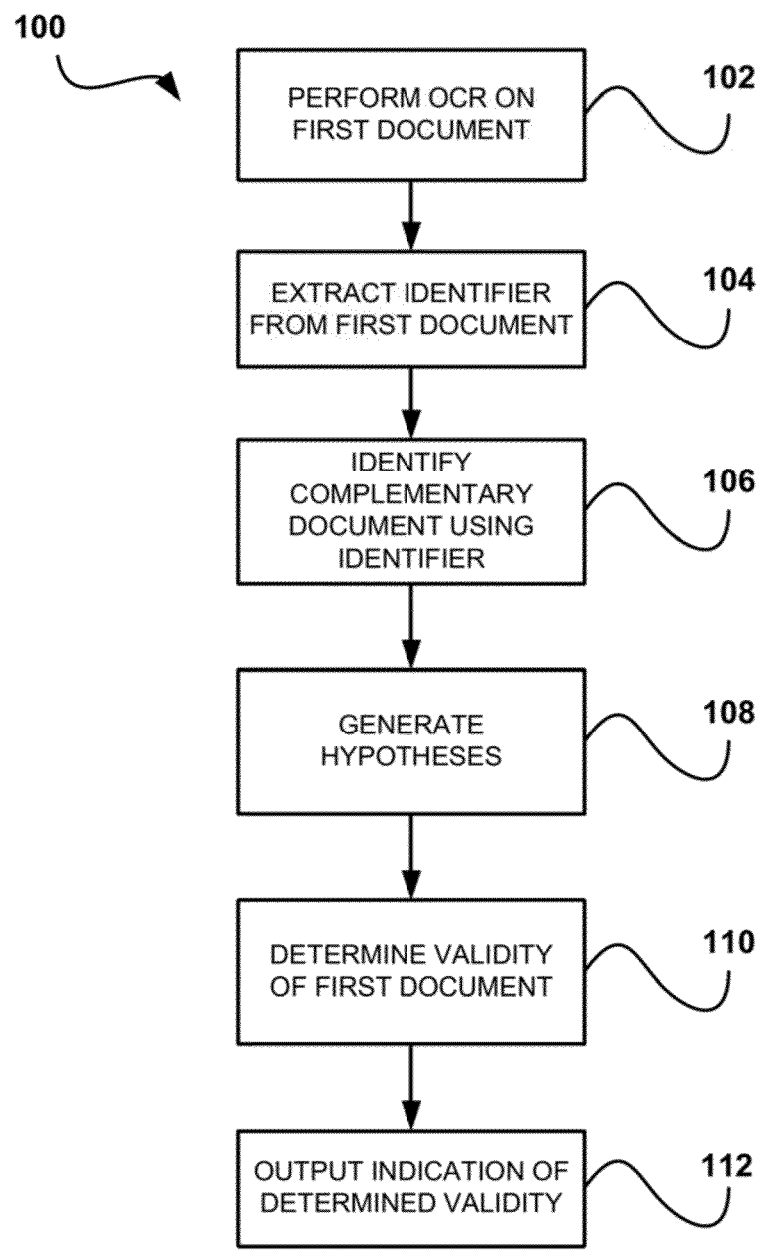
FIG. 1 is a method for determining document validity in accordance with one embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

It must also be noted that, as used in the specification and the appended claims, the singular forms "a," "an" and "the" include plural referents unless otherwise specified.

In one general embodiment, a method includes receiving an image of a document; performing optical character recognition (OCR) on the image; extracting an address of a sender and/or an address relating to the sender of the document from the image based on the OCR; comparing the extracted address with content in a first database; identifying complementary textual information in a second database based on the address; and at least one of: extracting additional content from the image of the document; correcting one or more OCR errors in the document using the complementary textual information, and normalizing data from the document prior to determining a validity of the document using at least one of the complementary textual information and predefined business rules. At least one of performing the OCR, extracting the address, comparing the extracted address, identifying the complementary textual information, extracting the additional content, correcting the one or more OCR errors and normalizing the data is performed using a processor of a mobile device.

In another general embodiment, a mobile device includes a processor and logic in and/or executable by the processor to cause the processor to: receive an image of a document; perform optical character recognition (OCR) on the image; extract an address of a sender of the document from the image based on the OCR; compare the extracted address with content in a first database; identify complementary textual information in a second database based on the address; and at least one of: extract additional content from the image of the document; correct one or more OCR errors in the document using the complementary textual information, and normalize data from the document prior to determining a validity of the document using at least one of the complementary textual information and predefined business rules.

In another general embodiment, a system includes a server having a server processor and logic in and/or executable by the server processor; and a mobile device having a mobile device processor and logic in and/or executable by the mobile device processor. The logic is configured to cause one or more of the processors, singly or in combination, to: receive an image of a document; perform optical character recognition (OCR) on the image; extract an address of a sender of the document from the image based on the OCR; compare the extracted address with content in a first database; identify complementary textual information in a second database based on the address; and at least one of: extract additional content from the image of the document; correct one or more OCR errors in the document using the complementary textual information, and normalize data from the document prior to determining a validity of the document using at least one of the complementary textual information and predefined business rules.

In yet another general embodiment a system includes a mobile device comprising a processor and logic in and/or executable by the processor to cause the processor to: receive an image of a part or all of a document selected from a group consisting of: a gift card, an invoice, a bill, a receipt, a sales order, an insurance claim, a medical insurance document, and a benefits document; perform optical character recognition (OCR) on the image; extract at least a partial address of a sender of the document; compare the at least partial address of the sender to a plurality of addresses in a first database; and identify one or more of: textual information specific to the sender; and data formatting specific to the sender. At least one of performing the OCR, extracting the at least partial address, and identifying one or more of the textual information and the data formatting specific to the sender is performed using the processor of the mobile device.

In still another general embodiment, a computer program product includes a computer readable storage medium having stored thereon computer readable program code, the computer readable program code executable by a processor of a mobile device to cause the processor to: receive an image of a document; perform optical character recognition (OCR) on the image; extract an address of a sender of the document from the image based on the OCR; compare the extracted address with content in a first database; identify complementary textual information in a second database based on the address; and at least one of: extract additional content from the image of the document; correct one or more OCR errors in the document using the complementary textual information, and normalize data from the document prior to determining a validity of the document using at least one of the complementary textual information and predefined business rules.

In yet another general embodiment, a method includes receiving an image of a part or all of a document selected from a group consisting of: an invoice, a bill, a receipt, a sales order, an insurance claim, a medical insurance document, and a benefits document; performing optical character recognition (OCR) on the image; extracting at least a partial address of a sender of the document; comparing the at least partial address of the sender to a plurality of addresses in a first database; and identifying one or more of textual information specific to the sender; and data formatting specific to the sender. At least one of performing the OCR, extracting the at least partial address, and identifying one or more of the textual information and the data formatting specific to the sender is performed using a processor of a mobile device.

In still yet another general embodiment, a mobile device includes a processor and logic in and/or executable by the processor to cause the processor to: receive an image of a part or all of a document selected from a group consisting of: an invoice, a bill, a receipt, a sales order, an insurance claim, a medical insurance document, and a benefits document; perform optical character recognition (OCR) on the image; extract at least a partial address of a sender of the document; compare the at least partial address of the sender to a plurality of addresses in a first database; and identify one or more of: textual information specific to the sender; and data formatting specific to the sender.

In even still yet another general embodiment, a computer program product includes a computer readable storage medium having stored thereon computer readable program code, the computer readable program code executable by a processor of a mobile device to cause the processor to: receive an image of a part or all of a document selected from a group consisting of an invoice, a bill, a receipt, a sales order, an insurance claim, a medical insurance document, and a benefits document; perform optical character recognition (OCR) on the image; extract at least a partial address of a sender of the document; compare the at least partial address of the sender to a plurality of addresses in a first database; and identify one or more of: textual information specific to the sender; and data formatting specific to the sender.

Typical documents that support a business transaction include documents that are exchanged while buying goods, for example, a tender document such as a check, debit/credit card, or gift card, a purchase order, an invoice, other documents such as a request for quotes, proof of delivery, etc. Of course, many other types of transactions exist.

For example, in one embodiment where the document includes a tender document, the presently disclosed techniques may be employed to facilitate providing pertinent information to the owner/holder of the tender document, such as an account balance, account number, routing number, etc. In one specific approach, an image may include a depiction of one or more faces of a tender document, and textual information comprising a unique identifier may be extracted from the image (e.g. an account number, personal identification number (PIN), full name, etc.) and utilized to retrieve related information from one or more complementary documents using a database lookup (and/or reverse lookup) to locate the related information and provide such information to the user.

In a particular exemplary embodiment, a gift cardholder wishes to check remaining balance on a gift card. The cardholder takes an image of the gift card, e.g. using a camera of a mobile device, and submits this image for validation. The validation engine locates a unique identifier from the image of the gift card, and utilizes this unique identifier to retrieve related account information from a complementary document (e.g. a record in a database linking unique gift card numbers to the associated deposit account(s) and related information such as remaining balance, expiration date of the gift card (where applicable), account/card issuing entity, suitable/valid third-party payment processing entities or services (e.g. VISA, AMERICAN EXPRESS, DISCOVER, PAYPAL, etc.) and/or other as would be understood by one having ordinary skill in the art upon reading the present descriptions).

The receiving party, in one approach, has to validate the content of the received document by comparing the document's content with its view of the transaction, which in most cases is stored electronically in a database; i.e., the receiver has to retrieve or extract the information from the received document and compare it to the corresponding information stored in its database. This, for example, can be achieved by a human reading the document, encoding its data, and comparing it to the corresponding content of the receiver's database. The extraction of the information can be, at least to some extent, automated by utilizing technologies that automatically extract the relevant information from the document.

Today many documents still are received on paper and are built for human readability. The layout and the forms of the documents differ vastly between senders and are loosely structured, making the automatic extraction and recognition of the relevant information using prior art methods very challenging and inaccurate. One way of extracting the information from a piece of paper is by the use of a program that first transforms the paper image into text, then navigates through the text and performs the extraction of the needed fields. The most advanced of these programs look for special features of the text or image to locate the relevant information. This requires significant knowledge of the document structure and the document language.

To finalize the validation, the extracted data are passed on to a person or a program that compares the extracted data with the content of the receiver database, corrects the errors, and validates the transaction. In order to achieve an effective automatic comparison of the extracted data to the content of the database, one has to first resolve semantic differences between the sender's and the receiver's language. There often exist many subtle differences in language, making direct and hence automatic comparisons ineffective. For example, the sender and the receiver might use different units resulting in different values that cannot be directly compared. Thus, data normalization that translates the sender's language to the receiver's language in his database has to occur prior to the automatic comparison to achieve a satisfactory automation rate.

An alternative process to validate business transactions is to utilize an electronic data interchange (EDI) which allows a direct, i.e. automatic, comparison and, thus, validation, of the transaction as understood by the parties involved without having to extract or to normalize the data. EDI achieves this level of automation by solving up-front the data normalization problem through the use of standardized document forms for the information exchange. The set-up of these forms is time- and cost-intensive, resulting in a process that does not adapt easily to a changing environment.

In one embodiment, an automatic business transaction validation process allows an automatic transaction validation level that comes close to EDI without the need of manually defining standardized document forms. This is achieved by going beyond the sequential process of information extraction, followed by data normalization and then comparison to the receiver's database as described above. The new process utilizes all information available simultaneously to validate the transaction. The different sources of information are the received document, the receiver's expectation of the transaction as stored in his database, and business rules pertaining to the specific transaction. The new process simultaneously analyzes the information from these sources and uses the complementary information to validate the interaction.

Specifically, it allows to automatically correct extraction and OCR errors as well as to automatically normalize the data yielding a highly efficient comparison of the received document to the receiver's database and, thus, results in an efficient automatic validation of the transaction. In addition, over time the process is able to learn data formatting specific to a sender, which in turn improves the level of automatic transaction validation for this specific sender. In summary, the new process allows out of the box automatic transaction validation independent of the source of the received documents (paper or electronic). Over time the process allows to automatically build highly specific data normalization for each receiver. In essence the new process generates automatically the standardized document form used by EDI on the receiver side.

In one embodiment, a paper invoice validation process includes the following steps. First, a paper invoice is scanned. Next, Optical Character Recognition (OCR) is applied to the scanned invoice. Additionally, information is extracted from the invoice. Examples of extracted invoice-header information are invoice-number, total amount charged, name and address of sender. Extracted information may also include an address which may not necessarily be a sender's address, but instead an address relating to a sender, for example an address of a sender's agent responsible for dispatching documents, an address of an intermediate recipient of the document (e.g. a courier or other mail handling facility, professional, or service, etc.), or any address that may be associated with a sender's address, for example an address associated with a sender's address in a relational database, in various approaches. The extraction of line item information like quantity, description, unit price, and total charge of line item is difficult to perform effectively and reliably. Accordingly, line item extraction may often be skipped.

Further, the extracted information is manually validated. If necessary, OCR errors and the labels assigned by the extractor to specific fields are corrected. For example, it is determined whether the number identified by the extractor to be the purchase order number is actually the customer number. Further still, the content of extracted information is validated by matching against the purchase order. For example, the total amount charged as extracted from the invoice may be matched to the total amount ordered in the purchase order. Also, the invoice is validated by checking validated information against invoice validation rules.

However, several challenges arise with this process. First, the set-up of an effective and reliable automatic extraction system is time intensive. Especially, as mentioned above, the extraction of line items is difficult. Automatic systems for line item extraction often rely on template-extraction, with the need of having a custom-built template for every vendor. Yet the information held by the line items is important to validate the invoice.

Additionally, for the validation of the invoice, a large portion of the extracted information may be irrelevant. Given the described process, the knowledge of which information is important for invoice validation and which information can be disregarded is not available to the operator responsible for validating the extracted information. As a result, the operator often validates and corrects more information than is actually needed. Further, manual validation of the content is time intensive. Automated validation of the content requires a set-up process in order to handle semantic differences between the invoice and the purchase order information. For example, the units might differ between the invoice and the purchase order. In short, one may have to normalize the invoice data in order to achieve an effective automated matching. The set-up of the data normalization is time and labor-intensive. For every supplier specific data normalization is required. Similarly, description of the ordered goods can vary substantially between the invoice and the purchase order. For example, a ninety degree connection pipe might be described as an elbow-connection pipe on the invoice and a right angle connection pipe on the purchase order.

The result of these challenges and problems is that automatic invoice validation is often ineffective and only applicable to a small portion of the incoming invoices, especially when also line item information is needed for the invoice validation. One can further improve the process by using electronic invoices, which effectively eliminate the first two challenges described above. For electronic invoices the data normalization step remains for automated content validation.

One disadvantage of the above invoice validation process is its sequential nature that processes one source of information at a time independent from the other sources of available information. For example, given a scanned paper invoice, the OCR step tries to find the most likely character sequence given the input of scanned pixels. The OCR step does not take into account the information from extraction and the information from validating the extracted content by matching to the purchase order. Obviously, this additional information constrains the possible character sequences and can therefore improve the OCR step. Business rules are another source of additional information that can benefit the OCR step, the extraction step, as well as the data normalization step. For invoices, an exemplary business role is that the total price of a line item should be equal to the quantity delivered of the line item times the unit price. By utilizing this information in the validation through matching steps, one can, for example, disambiguate unit differences between the invoice and the purchase order. These are just a few out of many examples that illustrate the advantage of simultaneously leveraging additional information in the validation process.

In contrast to the aforementioned process, the invoice validation process detailed below leverages several or all available sources of information simultaneously to determine the invoice's validity. In general, the sources of available information include the invoice itself, the corresponding purchase order, delivery notes, and business rules. The invoice validation process takes the information from OCR, extraction, validation of the extracted content by matching to the purchase order, and business rules. It evaluates the hypotheses allowed under the combined constraints of the given information and as a result gives a confidence score that indicates the validity of the invoice. In addition, the process also flags potential problems. For example, line items on the invoice that do not match to any position in the purchase order, under delivery, over delivery, price differences between the invoice and the purchase order, and so forth.

FIG. 1 shows a method 100 for determining document validity. It should be noted that the method 100 may be carried out in any desired environment.

As shown in operation 102, optical character recognition (OCR) is performed on a scanned image of a first document, which may be a paper document used as part of an overall transaction. The first document may include any physical representation of handwritten, typewritten or printed text. For example, the first document may include an invoice, a receipt, a bill, a sales order document, an insurance claim document, etc. In another example, the first document may include an explanation of benefits document, a medical insurance document, etc.

Additionally, in one embodiment, the scanned image may be generated by scanning the first document. For example, the document may be scanned using a personal or commercial hardware scanning device, using scanning software, etc.

Further, the scanned image may include any image that results from the scanning of a document. For example, the scanned image may include a JPEG image, a bitmap image, a TIFF image, a RAW image, etc. Of course, however, the scanned image may include any image type. Additionally, in the context of the current embodiment, optical character recognition may include any mechanical or electronic translation of the scanned image into machine-editable text.

It should be noted that the OCR step above may not need to be performed in particular circumstances. For example, in one instance, then first document may include an electronic document.

Additionally, as shown in operation 104, an identifier is extracted from the first document. In the context of the current embodiment, the identifier may include any aspect of the first document that can be used for purposes of identification. For example, the identifier may include a purchase order number, a heading of a document, a title of a document, a file name of an OCRed version of a document, etc. In one embodiment, the identifier may be extracted from the scanned and OCRed version of the first document.

In another embodiment, the identifier may be extracted from the first document by scanning one or more portions of the first document. In still another embodiment, the identifier may be extracted simultaneously with the OCRing of the document. In yet another embodiment, the identifier may be manually extracted. Of course, however, the identifier may be extracted from the first document in any manner.

Moreover, in an alternate approach, rather than extracting an identifier from the first document, the identifier may be obtained and/or input from some other source, e.g., from a user who inputs the identifier; from scanning a bar code on the first document; from a file name of the electronic image of the first document; etc.

An additional aspect of the presently disclosed inventive concepts may include utilizing data other than those data extracted from the document as the identifier. For example, in one approach the identifier may be the entire image of the document, e.g. raw image data "as-captured" using the capture device, or an entire image having been subjected to an extraneous processing operation, such as cropping to remove background, illumination correction (e.g. gamma balancing or adjustment), color depth reduction or conversion (e.g. converting a color image to grayscale or from one color coding scheme (e.g. RGB) to another (e.g. CMYK), etc. as would be understood by one having ordinary skill in the art upon reading the present descriptions.

A still further additional aspect of the presently disclosed techniques includes utilizing as the identifier an entirety of textual information identified and/or extracted from the document (e.g. via OCR). This exemplary approach may be particularly advantageous in embodiments subsequently employing fuzzy matching to validate a document, as described in further detail below. For example, in one embodiment utilizing an entirety of the textual information identified in the first document may be advantageous because the fuzzy matching process is provided more data from which to characterize and/or validate the document, enabling a more robust analysis of the content (e.g. textual information per se) and/or context of the document (e.g. the intended origin of the document, intended destination of the document, intended purpose of the document, etc. as would be understood by one having ordinary skill in the art upon reading the present descriptions).

Further, as shown in operation 106, a complementary document (or documents) associated with the first document is identified using the identifier. In the context of the current disclosures, the complementary document may include any document that is related in some way to the first document. For example, the complementary document may include at least one of a purchase order, a memorandum, a delivery note, etc. In another embodiment, the complementary document may have a relationship with the first document. For example, the complementary document may include a purchase order related to the first document, where the first document is an invoice.

In another embodiment, the complementary document may be identified by comparing the identifier against a database, repository, etc. For example, a purchase order may be identified by comparing a purchase order number against a purchase order repository. In yet another embodiment, the complementary document may be retrieved. For example, the complementary document may be retrieved from the database, repository, etc.

Also, as an option, the identifier may be additionally determined using an additional document that links the first document to the complementary document. For example, a vendor identifier may be extracted from an additional document that links a list of open purchase order numbers with identifiers of vendors.

Further still, as shown in operation 108, a list of hypotheses mapping the first document to the complementary document are generated using textual information from the first document, textual information from the complementary document, and predefined business rules. In one embodiment, the textual information from the first document and from the complementary document may include numerical information, text, a symbol, etc. For example, the textual information may include a description of goods, a line item, a header field item, a unit price, a quantity of goods, an extended price, etc.

In another embodiment, some textual information may be missing from the first document. For example, there may have been an error with OCRing. In response, columns of the first document may be validated in order to fill in any gaps, and operations such as a square balance may be performed in order to obtain correct textual information from the first document.

In yet another embodiment, a term on the first document may be correlated to a different term on the complementary document as referring to a same thing. For example, different entities, such as suppliers, customers, etc., may use a different description or different language for descriptions of products, units of measure, etc. In another embodiment, a closest match may be determined for the term on the first document if no direct correlation can be found. Additionally, the correlation of the terms may be stored in a database. For example, a translation database may be constructed on-the-fly during the generation of the list of hypotheses for later use.

In addition, the list of hypotheses may be generated using non-textual information from the first document and the complementary document, such as lines, colors, etc. Further, the list of hypotheses may be generated using location information from the first document and the complementary document. For example, the location information may include a location of textual information within the first document or complementary document. This location information may assist in generating the list of hypotheses. For example, the location of textual information that is known to be correct may be used to determine whether an error exists with other textual information.

In another embodiment, the hypotheses may include any correspondence between one or more items of textual information of the first document and the corresponding document. For example, the hypotheses may include a match between textual information from the first document and textual information from the corresponding document. Further, the predefined business rules may include any predetermined rules relating to a business. In one embodiment, the predefined business rules may relate to the first document or the complementary document. For example, the predefined business rules may include a rule that a total price of a line item is equal to a quantity multiplied by a unit price. In another example, the predefined business rules may include a rule that all line items have to equal a subtotal of the first document.

In addition, an expectation or other constraints may be used in the generation of the list of hypotheses. For example, an expectation from an ERP system disclosing that a particular amount of a certain product is to be expected may be used.

In one exemplary embodiment, any fields that potentially match between the first document and the complementary document are selected as potential fields for generating hypotheses. Additionally, a single field may have multiple potential corresponding hypotheses. Once all potentially matching fields have been determined, a structure of the first document and/or the complementary document is determined and the fields are grouped into logical order. For example, the fields may be grouped in a "nearest neighbor" manner. In another example, the fields may be grouped as a description, a quality, a price, a total, etc. Further, the predefined business rules are then used to confirm the validity of the fields. For example, a predefined business rule may confirm that an individual amount field multiplied by an individual cost field equals a total cost field. In this way, accurate hypotheses may be generated using little reconstruction or extraction.

In another exemplary embodiment, extraction is run over the OCRed version of the first document in order to provide textual information as well as an initial idea about each field. After an analysis utilizing the extracted textual information, the predefined business rules, and the complementary document, the extracted textual information is altered. For example, numbers, letters, and other field items are altered according to information obtained from the predefined business rules and the complementary document. After the alteration has occurred, an additional analysis is performed utilizing the altered extracted textual information, the predefined business rules, and the complementary document. In this way, the extracted textual information may be fine-tuned to more accurately relate to the complementary document.

In yet another exemplary embodiment, extraction is run over the OCRed version of the first document in order to identify all lines and groups of lines representative of line items. Additionally, a cross-correlation is performed between the complementary document and the extracted textual information from the first document. Further, the first document is reconstructed using the cross-correlation.

In another embodiment, OCR errors in the first document may be corrected using at least one of the textual information from the complementary document and the predefined business rules. Additionally, in another embodiment, data from the first document may be normalized using at least one of the textual information from the complementary document and the predefined business rules. Further, in yet another embodiment, data from the complementary document may be normalized using at least one of the textual information from the first document and the predefined business rules. For example, normalization may include converting grams to kilograms, ounces to grams, dollars to euro, etc.

In addition, as shown in operation 110, a validity of the first document is determined based on the hypotheses. In the context of the current embodiment, the validity may include an indication of whether the first document is sufficiently related to the complementary document. For example, the validity may include an indication that the first document matches the complementary document. Additionally, the validity may be determined by analyzing the hypotheses. In another embodiment, the determination may be additionally based on a confidence level of the hypotheses.

Further, in one embodiment, an alert may be generated upon encountering a potential problem when determining the validity of the first document. For example, the alert may include an identification of a mismatch in expected similar or identical values in the first and complementary documents. Additionally, in another embodiment, user input may be received indicating at least one of a correction and a validation of items such as a line item, header field item, etc. of the first document.

Further still, in another embodiment, determining the validity of the first document may include automatically estimating values for expected or actual line items, header field items, etc. in the first document. Also, determining the validity of the first document may include automatically correcting values for expected or actual line items, header field items, etc. in the first document based on at least one of the textual information from the complementary document and the business rules. In yet another embodiment, the first document may be reconstructed using the hypotheses and business rules, wherein the determining the validity step analyzes the reconstructed first document. As an option, determining the validity of the first document may include globally validating the textual information from the first document. For example, each line item of an invoice may be globally validated.

In still another embodiment, upon determining that the first document is valid, knowledge may be generated based on the hypotheses generated. For example, the generating the knowledge may include using transduction. Any transductive method known in the art can be used. Several transductive methods which may be used in various embodiments are set forth in U.S. Patent Application Pub. No. US 2008-0097936 A1 to Schmidtler et al., filed May 23, 2007, and which is herein incorporated by reference.

In one exemplary embodiment, once extracted textual information from the first document has been later verified by an individual, or the extracted textual information has been verified by a computer by the determination of a perfect match, the verification is sent to the extractor. In this way, the extractor "learns" from the verified information and can apply the verified information to future extraction an analysis.

Furthermore, as shown in operation 112, an indication of the determined validity is output. The output indication may include text, an image, a sound, or any other indication representative of the determined validity. For example, the indication may be output to a graphical display device, etc. Moreover, the indication may be output to, and stored on, a storage medium, e.g., of a type known in the art, such as RAM, ROM, hard drive, etc. In this way, the first document may be validated straight through, in most instances without human intervention, and with accurate knowledge of what is not valid in the first document. Additionally, in one embodiment, the determined validity may be used to validate a business transaction.

Additionally, a reconciliation screen may be output to a user upon failing to determine that the first document is valid or determining that the first document is invalid. For example, if one or more errors in the first document result in an unresolvable match with the complementary document, the errors are represented in the reconciliation screen, where a human operator (for example, an employee of the customer or the supplier) may view the errors and correct the first document in order to assist in the determination of the validity of the first document. The human operation may be notified via a message, e.g. an electronic mail message, that unresolvable errors exist with the first document. After human correction has been performed, the method may then be repeated on the corrected first document.

In another embodiment, a notification to access the reconciliation screen may be sent to a sender of the first document. Further, a modification to the first document may be received by a user viewing the reconciliation screen. Further still, re-validation of the modified first document may be attempted.

The methodology presented herein may be repeated for sequential documents, which may or may not relate to the same transaction. For example, assume that a second document is part of the same transaction as a first document. After determining the validity of the first document, the validity of a second document may be determined using the original complementary document again, and/or using the first document as the complementary document. Thus, an illustrative sequence may be to run the method of FIG. 1 to validate the first document, then perform OCR on a scanned image of a second document, and extract an identifier from the second document. A second complementary document associated with the second document is identified. As noted above, the second complementary document may be the same as that used to validate the first document, and/or the validated first document may be used as the second complementary document. In another approach, the second complementary document is some other document altogether. A list of hypotheses mapping the second document to the second complementary document is generated using: textual information from the second document, textual information from the second complementary document, and predefined business rules. A validity of the second document is determined based on the hypotheses, and an indication of the determined validity of the second document is output.

In one example, the first document may be an invoice, the validity of which is determined using an associated purchase order as the complementary document. The associated proof of delivery is also to be validated. However, assume it is difficult to validate the proof of delivery against the purchase order due to variations in the way quantities, costs, etc. are shown on the two documents. Once the invoice has been validated, it may be used as the complementary document to validate the proof of delivery.

Along a similar line, the general method may be performed to again attempt to determine the validity the first document, except this time a different complementary document is used. This approach may be useful for providing a higher confidence of the validity of the first document by providing two or more determinations of validity. This approach may also be used when a first attempt at validating the document fails.

Figure 2:
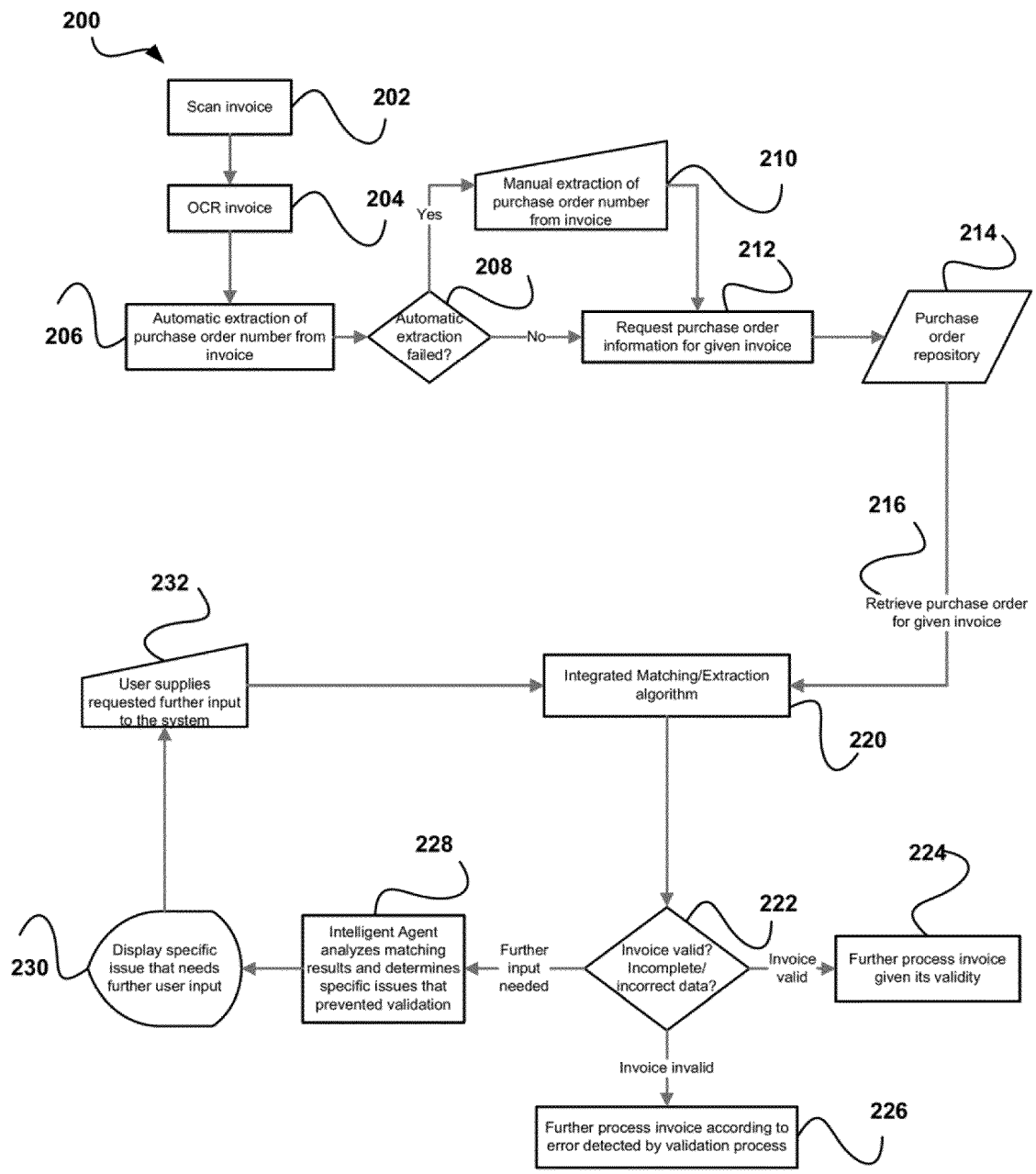
FIG. 2 is a method for determining a validity of an invoice in accordance with one embodiment of the present invention.

FIG. 2 shows a method 200 for determining a validity of an invoice, in accordance with another embodiment. As an option, the method 200 may be carried out in the context of the architecture and environment of FIG. 1. Of course, however, the method 200 may be carried out in any desired environment.

As shown in operation 202, an invoice is scanned. Additionally, in operation 204 the scanned invoice is OCRed. Further, in operation 206 an attempt is made to extract a purchase order number and/or a seller address from the invoice. In one embodiment, the extraction may be for purposes of identifying a purchase order corresponding to the invoice. In another embodiment, the extraction may be performed by a simple extractor.

In operation 208, it is determined whether the automatic extraction has failed. If it has, in operation 210 the purchase order number and/or the seller address are manually extracted from the invoice.

Additionally, if in operation 208 it is determined that the automatic extraction has not failed, in operation 212 purchase order information is requested for the given invoice from a purchase order repository 214. For example, the purchase order information may be requested from an ERP system.

Further, in operation 216 the purchase order for the given invoice is retrieved from the purchase order repository 214. In on embodiment, a set of purchase orders may be retrieved for the given invoice.

Also, the purchase order for the given invoice retrieved in operation 216 as well as the scanned and OCRed invoice are processed utilizing an integrated matching and extraction algorithm 220 which performs integrated iterative invoice validation, in one embodiment, line item information may be automatically identified and validated from the scanned and OCRed invoice by the integrated matching and extraction algorithm 220. For example, unit price, quantity, description of line item, and line item price, in addition to a subtotal charge, a tax charge, a shipping and handling charge, and a total price may be automatically identified and validated from the invoice. In another example, a statistical extractor may be run over the invoice. The statistical extractor may provide information about extracted data such as the unit price, quantity, description, line item price, etc.

In addition, it is determined by the integrated matching and extraction algorithm 220 in operation 222 whether the invoice is valid. For example, it may be determined whether the invoice contains incomplete or incorrect data. If it is determined in operation 222 that the invoice is valid, then in operation 224 the invoice is further processed given its validity. If it is determined in operation 222 that the invoice is invalid, then in operation 226 the invoice is further processed according to one or more errors detected by the validation process.

However, if it is determined in operation 222 that further input is needed, in operation 228, an intelligent agent analyzes any matching results and determines specific issues that prevented validation. Additionally, in operation 230 specific issues resulting from the analysis by the intelligent agent in operation 228 that need further input from a user are displayed. Further, in operation 232 the user supplies any requested further input, and this further input is in turn processed utilizing the integrated matching and extraction algorithm 220 along with the information extracted in operation 220 and the purchase order for the given invoice retrieved in operation 216.

For example, in the event that the invoice cannot be automatically validated, the system may request additional information from the user by prompting the user to correct and validate OCRed data and extraction results for specific fields on the invoice that prevented the automatic validation of the invoice. The corrected and validated information may then be fed back to the integrated matching and extraction algorithm 220 in order to reevaluate the validity of the invoice given the additional information. As an option, this process may be reiterated until the invoice is either validated or a serious problem with the invoice has been identified that makes the invoice invalid.

In another example, the system may automatically identify with high accuracy specific information on the invoice that prevents automatic validation. This may be achieved by the intelligent agent which analyzes matching hypotheses utilizing business rules. The intelligent agent may minimize the necessary input, which may result in highly efficient manual validation and correction.

As a result, the above method 200 offers many advantages when compared to other invoice validation approaches. For example, the above method 200 may provide zero set-up, and may allow for a substantially larger number of invoices that can be processed straight through without any human intervention. Additionally, the above method 200 may provide for accelerated manual validation and correction of OCR and extraction results, as well as an efficient identification of invalid invoices. In this way, it may be determined whether circumstances such as underdelivery, overdelivery, and overpricing are occurring based on one or more invoices without the need for a specialized employee to search or analyze such invoices.

Further, the above method 200 may provide for the simultaneous use of different sources of available information. By utilizing the knowledge from extraction, comparing it to the expectation of the purchase order, and checking against the applicable business rules, the above method 200 may yield improved extraction accuracy. In particular, line item extraction accuracy may be substantially improved. Further still, the above method 200 may provide for automatic OCR error correction as well as automatic data normalization. Also, since the above method 200 is an integrated process, any improvements may feed on each other. For example, improved OCR may result in improved extraction, which in turn may yield better matching, and so forth.

Figure 3:
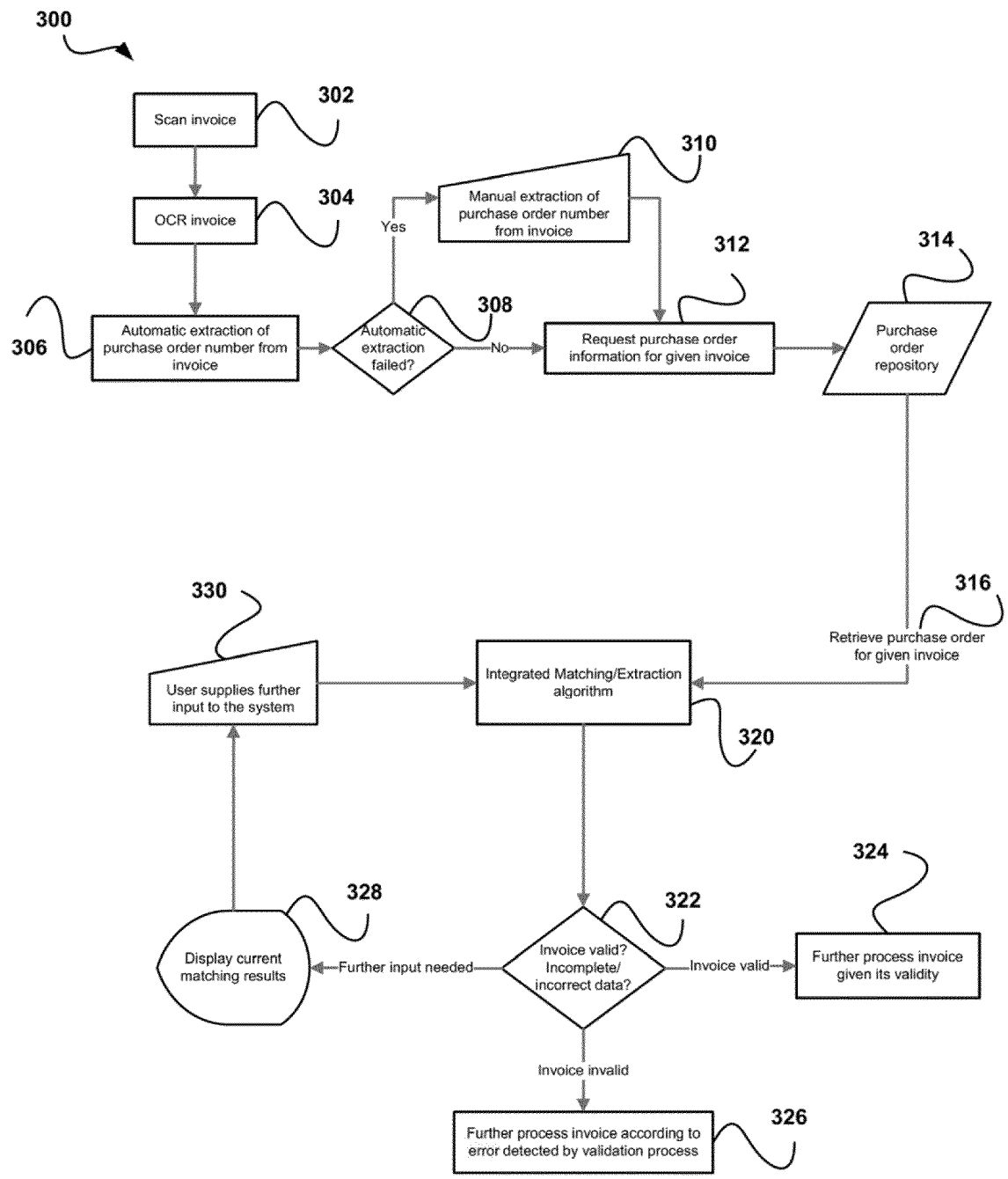
FIG. 3 illustrates a method for determining a validity of an invoice without the use of an intelligent agent in accordance with one embodiment of the present invention.

FIG. 3 shows a method 300 for determining a validity of an invoice without the use of an intelligent agent, in accordance with yet another embodiment. As an option, the method 300 may be carried out in the context of the architecture and environment of FIGS. 1 and/or 2. Of course, however, the method 300 may be carried out in any desired environment.

As shown in operation 302, an invoice is scanned. Additionally, in operation 304 the scanned invoice is OCRed. Further, in operation 306 an attempt is made to extract a purchase order number and/or a seller address from the invoice. In operation 308, it is determined whether the automatic extraction has failed. If it has, in operation 310 the purchase order number and/or the seller address are manually extracted from the invoice.

Additionally, if in operation 308 it is determined that the automatic extraction has not failed, in operation 312 purchase order information is requested for the given invoice from a purchase order repository 314. For example, the purchase order information may be requested from an ERP system.

Further, in operation 316 the purchase order for the given invoice is retrieved from the purchase order repository 314. In on embodiment, a set of purchase orders may be retrieved for the given invoice.

Also, the scanned and OCRed invoice, as well as the purchase order for the given invoice retrieved in operation 316, are processed utilizing an integrated matching and extraction algorithm 320 which performs integrated iterative invoice validation. In addition, it is determined by the integrated matching and extraction algorithm 320 in operation 322 whether the invoice is valid. For example, it may be determined whether the invoice contains incomplete or incorrect data.

If it is determined in operation 322 that the invoice is valid, then in operation 324 the invoice is further processed given its validity. If it is determined in operation 322 that the invoice is invalid, then in operation 326 the invoice is further processed according to one or more errors detected by the validation process.

However, if it is determined in operation 322 that further input is needed, in operation 328, current matching results are displayed. Additionally, in operation 330 a user supplies further input into the system, and this further input is in turn processed utilizing the integrated matching and extraction algorithm 320 along with the information extracted in operation 320 and the purchase order for the given invoice retrieved in operation 316.

In one embodiment, the validity of the invoice may be determined by simultaneously leveraging information from OCR, information from extraction, matching to a purchase order, business rules, and potentially manually validated information. An example of an algorithm used for this integrated matching process is described in the embodiment below.

In the context of the current embodiment, a position includes a purchase order position, an invoice line includes a physical line on an invoice, and a line-item includes a description of a specific good delivered and the corresponding charges. Additionally, a line-item field includes a component of a line-item with a particular meaning, for example, description of the goods delivered, unit price, quantity and/or extended price. Further, the description includes the specific line-item field that describes the goods delivered. Also, a position match candidate (PMC) includes a combination of line-items that is a candidate to match to a purchase order position. In one embodiment, PMCs may map one to one to positions, whereas line-items do not necessarily have a one to one mapping to positions.

The matching and extraction algorithm validates invoices by comparing the information given on an invoice with the corresponding purchase order. To this end the algorithm performs the following tasks. First, the algorithm validates line-items by associating the line-items on a given invoice with the open purchase order positions of this invoice. Additionally, the algorithm validates the invoice by checking the consistency of the invoice given the extracted values for total, subtotal, taxes as well as other additional charges like shipping and handling against the sum of the validated line-items. Further, the algorithm outputs a score that indicates the validity of the invoice as well as the best association as determined by the algorithm of the line-items and their fields to the purchase order positions.

The algorithm generates a list of matching hypotheses. In one example, a matching hypothesis is a possible association of the line-items and their respective fields to the list of open purchase order positions as well as possible values for total, subtotal, tax and other additional charges necessary to validate the invoice. The algorithm determines for each of the generated hypotheses an overall cost of the association and validation. The hypothesis with the lowest cost is elected as the final result.

The cost may be based on different sources of information. For example, the algorithm may utilize OCR results and a confidence of characters. Additionally, the algorithm may utilize extractor results, e.g. a list of possible label assignments and the associated confidences for every token on the invoice. Further, the algorithm may utilize user provided input such as correction of OCR and extraction results, as well as purchase order information and business rules.

Matching hypotheses are generated in a two-step process. The first step forms a set of PMCs from the invoice line-items. However, a complicating factor here is that line-items may not necessarily map one to one to positions. On occasion, several line-items may map to the same position. Additionally, in one embodiment, several positions may map to the same line-item. Accordingly, the algorithm generates PMCs by combining line-items given the extraction and OCR results. Additionally, in yet another embodiment, line item match candidates (LIMCs) may be created from the set of positions in order to handle the case where several positions map to the same line item.

The second step finalizes the creation of the matching hypothesis by electing a specific one to one mapping of the generated PMC set to the positions and the resulting validation. In another approach, a specific one to one mapping of the generated LIMC set to the line items is selected. In yet another approach, a combination of the foregoing may be used.

For simplicity, the following will refer to PMCs, though it is to be understood that similar methodology may be applied to use of LIMCs and/or the combination of PMCs and LIMCs. The overall cost c of the matching hypothesis is the sum of the individual costs of the two steps, as shown in Table 1.

TABLE 1

$$c = cPMC + cMAP$$

As shown in Table 1, cPMC indicates the cost of generating a specific set of PMCs and cMAP is the cost associated with a specific one to one mapping of the generated PMC set to positions and the validation of the invoice. The cost cPMC is factored into the following sum, as shown in Table 2.

TABLE 2

$$cPMC = cprior + cline + cextraction + cOCR + csequence + calignment$$

The different costs cprior, cextraction, cOCR, csequence, calignment and cline are defined as shown in Table 3.

TABLE 3

| | |
|---|---|
| eprior: | Cost associated with a specific combination of line-items. It is a heuristic cost containing prior knowledge regarding the combination of line-items. For example the combination of line-items that appear in consecutive order on the invoice is preferred over the combination of nonconsecutive line-items. |
| cline: | The logarithmic sum of the probabilities of the line-items used for the current PMC set to be line-items versus generic invoice lines. The probabilities are based on the different format of line-items compared to generic invoice lines. |
| cextraction: | The logarithmic sum of extraction probabilities of the tokens that have been assigned the labels description, quantity, unit price and extended price for the current PMC set. |
| cOCR: | The tokens assigned the labels quantity, unit price and extended price by the current PMC set have to fulfill the constraint that quantity times unit price equals extended price. The cost cOCR is the cost associated with fulfilling this algebraic constraint given the OCR confidences of the different characters in these tokens. |
| csequence: | This cost captures the prior knowledge that some sequences of line-item fields are more likely than others. For example it is unlikely to observe on an invoice that extended price is the first line-item field on a line-item followed by unit price, quantity and finally description, whereas the sequence description, quantity, unit price and extended price is quite common for a line-item. |
| calignment: | Cost that reflects the observation that line-item fields tend to be aligned vertically |

The mapping cost cMAP of the second step is shown in Table 4.

TABLE 4 cMAP = cmatch + cvalid

The variable cmatch represents the total cost of the one to one mapping of the current PMC set to the positions. It is the sum over the individual matching costs of matching a single PMC to a position. The single matching costs are derived from the cost of fuzzy matching the individual line-item fields description, quantity, unit price, and extended price to the corresponding entries in the position. The fuzzy matching takes into account the OCR confidence of the individual characters in the extracted line-item fields.

The variable cvalid represents the cost that determines the validity of the invoice given the elected one to one mapping of the current PMC set to positions and checking this information against additional information extracted from the invoice according to predefined business rules. For example, the default business rule may be that the sum of the extended prices of the current PMC set balances with the extracted values for invoice subtotal, invoice total, tax, and additional extracted charges like shipping and handling. The cost may be based on the extraction probabilities of the extracted values and the associated OCR confidences of the individual characters.

The number of matching hypotheses grows in a factorial manner depending on the number of line-items as well as positions. Accordingly, an exhaustive search for the best matching hypothesis becomes quickly unpractical for invoices with more than a dozen of line-items and positions when using prior art methods. The developed algorithm approximates the search efficiently and effectively. The elected approach is described in the following paragraphs.

The number of possible PMC sets is factorial in the number of line-items. Similarly, the number of possible one to one mappings to positions given a specific PMC set is factorial in the number of positions and line-items. Accordingly, the number of resulting possible matching hypotheses is a factorial number of PMC sets combined with an factorial number of mappings making, as mentioned above, an exhaustive search of the matching hypothesis space unpractical using prior art methods.

Searching the PMC set space independently from the mapping space would reduce the complexity of the search. However, this approach yields suboptimal associations of line-items to positions. It applies too severe restrictions on the matching hypothesis search space leading to local optima. An illustrative example is an invoice with a rarely observed layout of line-items. In this instance the best guess for extracted line-item fields is likely to be systematically wrong. Still, the additional costs in cPMC do not sufficiently constrain the problem to overcome the wrong extraction results and, thus, ultimately yield a wrong association of line-items to positions. In this case, the simultaneous analysis of the information contained in the mapping cost cMAP is necessary to resolve the problem.

The elected algorithm searches the PMC set space and the mapping space simultaneously. It copes with the combinatorial growth of the search space given the number of line-items and positions by leveraging a priori knowledge of the specific problem. For example, an exhaustive search of all possible mappings given a specific PMC set is unnecessary. At that point the problem is sufficiently constrained and a greedy search for the best mapping is sufficient. On the other hand a greedy search for the best PMC set tends to yield a suboptimal association of line-items to positions. The final strategy adopted for the search is to apply a restricted combinatorial search of the PMC set space and to combine it with a greedy search for the best mapping given a specific PMC set. The algorithm uses stochastic annealing for the restricted combinatorial search of the PMC set space.

TABLE 5

Algorithm 1 Matching algorithm to find best association of line-items to purchase order positions.

Require: Positions P for given invoice.

Require: Invoice I, I contains the tokens of the invoice together with their (x,y) positions as well as their corresponding OCR and extraction results.

TABLE 5-continued

Algorithm 1 Matching algorithm to find best association of line-items to purchase order positions.

```
1: I := updateInvoice(I) {Depending on additional external input update information
   contained in I. For example user provided validation or correction
   of line-item fields and OCR results.}
2: (M,setOfPMCs,c_MAP,c_PMC) := initializeMatchingHypothesis(P,I)
   {The procedure initializeMatchingHypothesis elects an initial set of
   PMCs setOfPMCs and determines its best mapping M to positions. It
   returns the initial matching hypothesis (M,setOfPMCs) and its cost c_PMC
   and c_MAP.}
3: bestMatch := (M,setOfPMCs) {Current best association of line-items to
   positions.}
4: minCost := c_PMC + c_MAP {Current best cost associated with bestMatch.}
5: while minCost improves sufficiently do
6:    (c_PMC,setOfPMCs) := nextPMC(c_PMC,setOfPMCs,I)
      {Generate next PMC set and its cost using stochastic annealing.}
7:    (c_MAP,M) := findMap(setOfPMCs) {Find best mapping M for
      setOfPMCs and its cost c_MAP using greedy search.}
8:    c := c_PMC + c_MAP {Overall cost c of current matching hypothesis given
      by setOfPMCs and M.}
9:    if c < minCost then
10:       minCost := c
11:       bestMatch := (M,setOfPMCs)
12:   end if
13:   updateAnnealingSchdedule() {Procedure that monitors the changes in
      the individual costs that constitute the cost c_PMC and their relation with
      the overall cost c. It updates the annealing schedules needed in the routine
      nextPMC accordingly.}
14: end while
```

Table 5 describes the aforementioned process in more detail. It starts with a matching hypothesis by generating an initial PMC set and associating the individual PMCs greedily to positions. The main loop of the algorithm tries to improve on the initial matching hypothesis by iterating through the matching hypothesis space. Within each iteration of the main loop the algorithm chooses a PMC set using stochastic annealing and determines its best mapping to positions using a greedy search. The algorithm terminates when the improvement of the overall cost c becomes marginal.

TABLE 6

Algorithm 2 Routine nextPMC.

```
Require: Input PMC set setOfPMCs.
Require: Cost c_PMC of setOfPMCs.
Require: Invoice I.
  1: (modCombo,cost) := modifiedLineItemCombination(setOfPMCs,I)
     {Procedure that randomly add/removes line-items and their
     combination according to the cost c_prior, c_line and
     the annealing schedule. It returns a modified combination modCombo
     of line-items and the new cost for c_prior and c_line.}
  2: (c_PMC,setOfPMCs) := modifiedPMCs(setOfPMCs,I) {Procedure
     that changes randomly labels of some of line-item fields according
     to the cost c_extraction,c_OCR,c_sequence,c_alignment
     and the annealing schedule. It returns the modified set of PMCs
     setOfPMCs and its new cost c_PMC.}
```

Table 6 illustrates the procedure for iteratively generating the PMC set. A modified PMC set is generated by first making small changes to the current combination of line-items and the considered set of line-item candidates. The changes are sampled according to the costs cprior and cline. Given the current annealing temperature elected changes with a higher cost cprior+cline are sometimes accepted. In a second step the labels of some line-item fields are randomly modified using the costs cextraction, cOCR, csequence, calignment and the current annealing temperature.

While the present invention has been illustrated and described with reference to specific embodiments, further modification and improvements will occur to those skilled in the art. It is to be understood, therefore, that this invention is not limited to the particular forms illustrated and that it is intended in the appended claims to cover all possible modifications of the teachings herein.

The present description is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention is executed illustratively incorporates one or more general-purpose computers or special-purpose devices such facsimile machines and hand-held computers. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, non-volatile memory device, etc.

Figure 4:
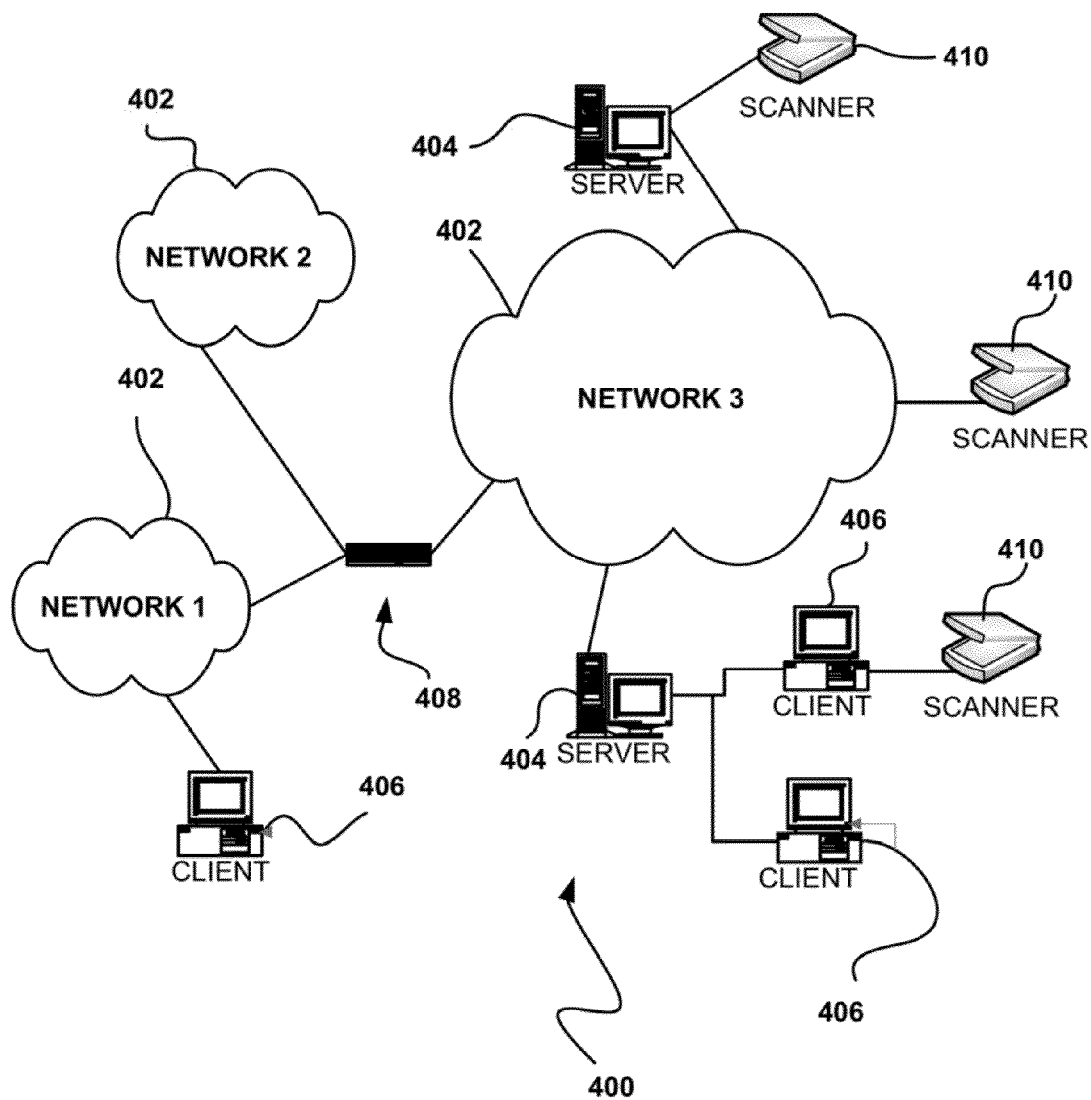
FIG. 4 illustrates a network architecture, in accordance with one embodiment.

FIG. 4 illustrates a network architecture 400, in accordance with one embodiment. As shown, a plurality of networks 402 is provided. In the context of the present network architecture 400, the networks 402 may each take any form including, but not limited to a local area network (LAN), a wireless network, a wide area network (WAN) such as the Internet, peer-to-peer network, etc.

Coupled to the networks 402 are servers 404 which are capable of communicating over the networks 402. Also coupled to the networks 402 and the servers 404 is a plurality of clients 406. Such servers 404 and/or clients 406 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 402, at least one gateway 408 is optionally coupled therebetween.

One or more scanners 410 may be coupled to a network, a server 404 and/or a client 406. The scanner(s) 410 may be accessible by the attached machine and/or remotely by other machines via any interconnection path.

Figure 5:
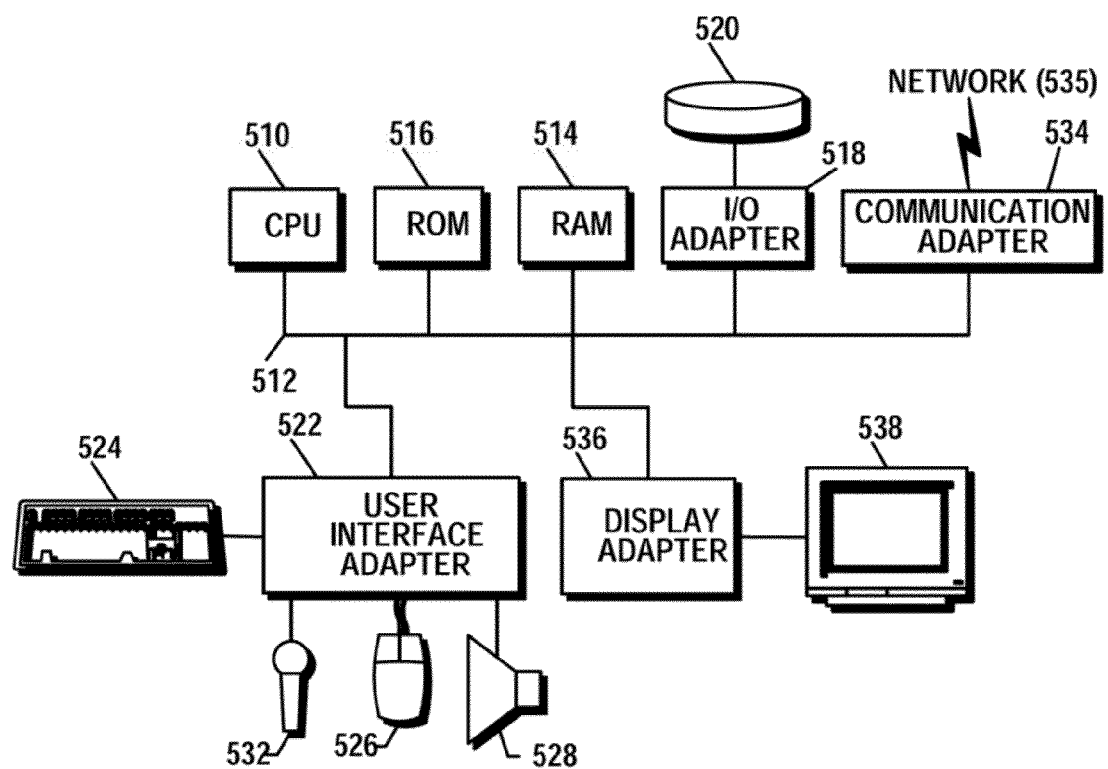
FIG. 5 shows a representative hardware environment that may be associated with the servers and/or clients of FIG. 4, in accordance with one embodiment.

FIG. 5 shows a representative hardware environment that may be associated with the servers 404 and/or clients 406 of FIG. 4, in accordance with one embodiment. Such figure illustrates a typical hardware configuration of a workstation in accordance with one embodiment having a central processing unit 510, such as a microprocessor, and a number of other units interconnected via a system bus 512.

The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen (not shown) to the bus 512, communication adapter 534 for connecting the workstation to a communication network 535 (e.g., a data processing network) and a display adapter 536 for connecting the bus 512 to a display device 538.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

In still more approaches, the presently disclosed inventive concepts may be embodied in, practiced using, and/or applied to mobile technology and/or mobile devices. Without limitation, any of the aforementioned document validation tools, concepts, operations, etc. may be performed using a mobile device, such as capturing an image of a document using the mobile device camera, performing one or more document validation operations/algorithms as described herein using a processor of a mobile device, receiving and/or distributing captured images of documents using a mobile device, receiving and/or distributing document validation results using a mobile device, etc. as would be understood by one having ordinary skill in the art upon reading the present descriptions.

As referred-to herein, a mobile device should be understood to include any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

Similarly, while various embodiments have been described herein as employing a scanner, or involving "scanning" a document, image, etc., it should be understood that the concepts are equally applicable to mobile devices, for example any "scanning" operation discussed herein may be applied to a mobile device and/or mobile computing environment, for example by capturing an image using a mobile device camera rather than "scanning" the image or document.

Those having ordinary skill in the art will appreciate that image data generated using a scanner and image data generated using a camera may have unique aspects or characteristics in some approaches. For example, an image captured using a mobile device camera may include artifacts such as skew, perspective distortion (such as apparent warping or curvature in a truly flat or straight surface/edge), illumination, blur, etc. as would be understood by one having ordinary skill in the art upon reading the present descriptions. Nonetheless, the presently described inventive concepts should be understood as being equally applicable to both traditional scanners and associated computing equipment/resources, as well as mobile capture devices and/or processing devices, in illustrative embodiments Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one exemplary approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

In particularly preferred embodiments, document validation may additionally and/or alternatively employ one or more image processing functionalities such as disclosed in related U.S. Appl. Nos. 61/586,062, filed Jan. 12, 2012; 61/720,958, filed Oct. 31, 2012; 61/780,747, filed Mar. 13, 2013; 61/815,210, filed Apr. 23, 2013; 61/819,463, filed May 3, 2013; 61/883,865, filed Sep. 27, 2013; Ser. No. 13/740,123, filed Jan. 11, 2013; Ser. No. 13/740,145, filed Jan. 11, 2013; and Ser. No. 13/802,226, filed Mar. 13, 2013, each of which is herein incorporated by reference.

Of course, the various embodiments set forth herein may be implemented utilizing hardware, software, or any desired combination thereof. For that matter, any type of logic may be utilized which is capable of implementing the various functionality set forth herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving an image of a document;
performing optical character recognition (OCR) on the image;
extracting an address of a sender of the document from the image based on the OCR;
comparing the extracted address with content in a first database;
identifying complementary textual information in a second database based on the address; and
at least one of:
extracting additional content from the image of the document;
correcting one or more OCR errors in the document using the complementary textual information, and
normalizing data from the document prior to determining a validity of the document using at least one of the complementary textual information and predefined business rules,
wherein at least one of performing the OCR, extracting the address, comparing the extracted address, identifying the complementary textual information, extracting the additional content, correcting the one or more OCR errors and normalizing the data is performed using a processor of a mobile device.

2. The method as recited in claim 1, further comprising validating textual information in the document.

3. The method as recited in claim 1, further comprising correlating textual information from the document to textual information in a complementary document.

4. The method as recited in claim 3, wherein the complementary document comprises an electronic document in the second database.

5. The method as recited in claim 3, wherein the complementary document comprises an extraction template.

6. The method as recited in claim 1, further comprising updating text of the document, wherein the updating comprises correcting one or more of the OCR errors.

7. The method as recited in claim 1, further comprising determining whether the document is related to a complementary document.

8. The method as recited in claim 7, further comprising determining a confidence level of the determination of whether the document is related to the complementary document.

9. The method as recited in claim 1, wherein the one or more OCR errors comprise one or more of incorrectly identified characters and unidentified characters.

10. The method as recited in claim 1, wherein one or more of the comparing and the identifying comprises fuzzy matching.

11. The method as recited in claim 1, wherein extracting the address of the sender comprises scanning a barcode.

12. The method as recited in claim 1, wherein the complementary textual information corresponds to one or more fields of a complementary document.

13. The method as recited in claim 1, wherein the additional content comprises one or more of:
textual information in a format specific to the sender; and
non-textual information specific to the sender.

14. The method as recited in claim 1, wherein extracting the additional content utilizes one or more of:
an extraction template configured to facilitate template-based extraction; and
location information regarding the additional content.

15. A system, comprising:
a server having a server processor and logic in and/or executable by the server processor; and
a mobile device having a mobile device processor and logic in and/or executable by the mobile device processor;
wherein the logic is configured to cause one or more of the processors, singly or in combination, to:
receive an image of a document;
perform optical character recognition (OCR) on the image;
extract an address of a sender of the document from the image based on the OCR;
compare the extracted address with content in a first database;
identify complementary textual information in a second database based on the address; and
at least one of:
extract additional content from the image of the document;
correct one or more OCR errors in the document using the complementary textual information, and
normalize data from the document prior to determining a validity of the document using at least one of the complementary textual information and predefined business rules.

16. A method, comprising:
receiving an image of a part or all of a document selected from a group consisting of: a gift card, an invoice, a bill, a receipt, a sales order, an insurance claim, a medical insurance document, and a benefits document;
performing optical character recognition (OCR) on the image;
extracting at least a partial address of a sender of the document;
comparing the at least partial address of the sender to a plurality of addresses in a first database; and
identifying one or more of:
textual information specific to the sender; and
data formatting specific to the sender, wherein at least one of performing the OCR, extracting the at least partial address, and identifying one or more of the textual information and the data formatting specific to the sender is performed using a processor of a mobile device.

17. The method as recited in claim 16, further comprising validating textual information in the document.

18. The method as recited in claim 16, further comprising correlating textual information from the document to textual information in a complementary document.

19. The method as recited in claim 16, further comprising updating textual information of the document, wherein the updating comprises correcting one or more OCR errors in the textual information of the document.

20. The method as recited in claim 19, wherein the one or more OCR errors comprise one or more of incorrectly identified characters and unidentified characters.

21. The method as recited in claim 16, wherein one or more of the comparing and the identifying comprises fuzzy matching.

22. The method as recited in claim 16, wherein extracting the at least partial address comprises scanning a barcode.

23. The method as recited in claim 16, wherein the data formatting specific to the sender comprises one or more fields corresponding to fields of a complementary document.

24. The method as recited in claim 16, further comprising comparing one or more portions of the document to one or more portions of a complementary document, wherein the complementary document is at least one of:
    an electronic document in a second database; and
    an extraction template.

25. The method as recited in claim 16, further comprising:
    determining whether the document is related to a complementary document.

26. The method as recited in claim 25, further comprising determining a confidence level of the determination of whether the document is related.

27. The method as recited in claim 16, wherein the data formatting specific to the sender comprises at least one of:
    textual information in a format specific to the sender; and
    non-textual information.

28. The method as recited in claim 16, further comprising extracting additional content from the image of the document.

29. The method as recited in claim 28, wherein extracting the additional content utilizes one of more of: a template-based extraction technique; and location information regarding the additional content.

30. A system, comprising:
    a mobile device comprising a processor and logic in and/or executable by the processor to cause the processor to:
    receive an image of a part or all of a document selected from a group consisting of: a gift card, an invoice, a bill, a receipt, a sales order, an insurance claim, a medical insurance document, and a benefits document;
    perform optical character recognition (OCR) on the image;
    extract at least a partial address of a sender of the document;
    compare the at least partial address of the sender to a plurality of addresses in a first database; and
    identify one or more of:
        textual information specific to the sender; and
        data formatting specific to the sender,
    wherein at least one of performing the OCR, extracting the at least partial address, and identifying one or more of the textual information and the data formatting specific to the sender is performed using the processor of the mobile device.

* * * * *

UNITED STATES PATENT AND TRADEMARK OFFICE
CERTIFICATE OF CORRECTION

| | | |
|---|---|---|
| PATENT NO. | : 8,774,516 B2 | Page 1 of 1 |
| APPLICATION NO. | : 14/078402 | |
| DATED | : July 8, 2014 | |
| INVENTOR(S) | : Amtrup et al. | |

It is certified that error appears in the above-identified patent and that said Letters Patent is hereby corrected as shown below:

In the specification:

col. 7, line 51 replace "role" with --rule--;

col. 12, line 4 replace "an" with --and--;

col. 13, line 43 replace "validation, in" with --validation. In--.

Signed and Sealed this
Eleventh Day of November, 2014

Michelle K. Lee
*Deputy Director of the United States Patent and Trademark Office*